(12) United States Patent
Nijim

(10) Patent No.: US 7,239,842 B2
(45) Date of Patent: Jul. 3, 2007

(54) TALKING E-BOOK

(75) Inventor: Yousef Wasef Nijim, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/154,147

(22) Filed: May 22, 2002

(65) Prior Publication Data

US 2003/0219706 A1 Nov. 27, 2003

(51) Int. Cl.
*G09B 5/00* (2006.01)
(52) U.S. Cl. .................. 434/317; 434/307 R; 345/901
(58) Field of Classification Search ........ 434/317–319, 434/307 R, 169, 308, 365; 345/169, 173 345/901
See application file for complete search history.

(56) References Cited

U.S. PATENT DOCUMENTS 5,847,698 A * 12/1998 Reavey et al. .............. 345/173
6,041,215 A * 3/2000 Maddrell et al. ........... 434/317
6,297,812 B1* 10/2001 Ohara et al. ................ 345/173
6,313,828 B1* 11/2001 Chombo ..................... 345/169
6,363,239 B1* 3/2002 Tutt et al. ................... 434/317
6,442,517 B1* 8/2002 Miller et al. ................ 704/201
6,456,725 B1* 9/2002 Cox et al. ................... 382/100
6,526,335 B1* 2/2003 Treyz et al. .................... 701/1
2002/0078819 A1* 6/2002 Kim ............................ 84/609
2003/0177134 A1* 9/2003 Kim ........................... 707/100

FOREIGN PATENT DOCUMENTS

WO  WO 01/09785 A1  2/2001
WO  WO 02/39312 A1  5/2002

\* cited by examiner

*Primary Examiner*—Joe H. Cheng
(74) *Attorney, Agent, or Firm*—Joseph J. Laks; Jeffrey M. Navon

(57) ABSTRACT

There is provided an Ebook. The Ebook includes a memory device, an MP3 decoder, and at least one speaker. The memory device stores files. The files include at least one MP3 file. The MP3 decoder decodes the MP3 file to output text. The at least one speaker audibly reproduces the text.

20 Claims, 4 Drawing Sheets

TALKING E-BOOK

BACKGROUND OF THE INVENTION

CROSS-REFERENCE TO RELATED APPLICATIONS

This application is related to the U.S. patent application Ser. No. 10/142,406, entitled "TEST-TO-SPEECH (TTS) FOR HAND-HELD DEVICES", and U.S. patent application Ser. No. 10/135,151, entitled "MIXING MP3 AUDIO AND T T P FOR ENHENCED E-BOOK", which which are commonly assigned and concurrently filed herewith, and the disclosures of which are incorporated herein by reference.

FIELD OF THE INVENTION

The present invention generally relates to electronic books (Ebooks) and, more particularly, to a talking Ebook.

BACKGROUND OF THE INVENTION

An electronic book (also referred to as an "Ebook") is an electronic version of a traditional print book (or other printed material such as, for example, a magazine, newspaper, and so forth) that can be read by using a personal computer or by using an Ebook reader. Unlike PCs or handheld computers, Ebook readers deliver a reading experience comparable to traditional paper books, while adding powerful electronic features for note taking, fast navigation, and key word searches. However, such actions, irrespective of whether or not they are performed on a PC, handheld computer, or Ebook reader, generally require the user to read the text from a display. Thus, the use of an Ebook generally requires the user to focus his or her visual attention on a display to read the text content (e.g., book, magazine, newspaper, and so forth) of the Ebook.

Accordingly, it would be desirable and highly advantageous to have an Ebook that allows a user to assimilate content without having to look at a display.

SUMMARY OF THE INVENTION

The problems stated above, as well as other related problems of the prior art, are solved by the present invention, a talking Ebook.

According to an aspect of the present invention, there is provided an Ebook. The Ebook comprises a memory device, an MP3 decoder, and at least one speaker. The memory device stores files. The files include at least one MP3 file. The MP3 decoder decodes the MP3 file to output text. The at least one speaker audibly reproduces the text.

According to another aspect of the present invention, there is provided a method for using an Ebook. At least one MP3 file is stored in the Ebook. The at least one MP3 file includes data for audibly reproducing text. The MP3 file is decoded to output the text. The text is audibly reproduced.

These and other aspects, features and advantages of the present invention will become apparent from the following detailed description of preferred embodiments, which is to be read in connection with the accompanying drawings.

DETAILED DESCRIPTION OF THE INVENTION

The present invention is directed to a talking Ebook. It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
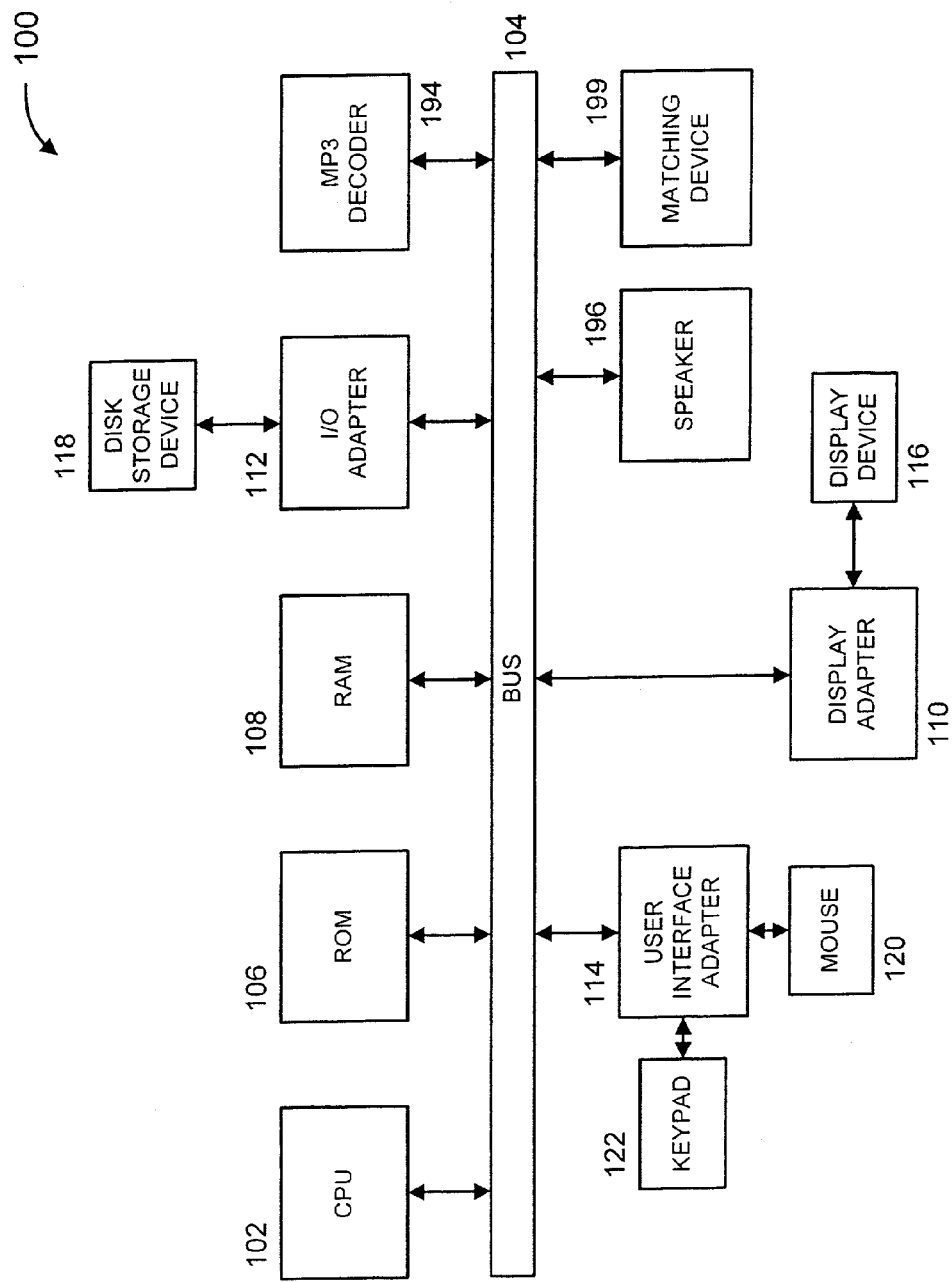
FIG. 1 is a block diagram illustrating a computer system 100 to which the present invention may be applied, according to an illustrative embodiment of the present invention.

FIG. 1 is a block diagram illustrating a computer system 100 to which the present invention may be applied, according to an illustrative embodiment of the present invention. The computer processing system 100 includes at least one processor (CPU) 102 operatively coupled to other components via a system bus 104. A read only memory (ROM) 106, a random access memory (RAM) 108, a display adapter 110, an I/O adapter 112, and a user interface adapter 114 are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keypad 122 are operatively coupled to system bus 104 by user interface adapter 114. The mouse 120 and keypad 122 are used to input and output information to and from system 100. It is to be appreciated that keypad 122 may be a standard keyboard (e.g., qwerty type) or may be a specialized keyboard or keypad having an abbreviated key set.

The computer system 100 further includes an MP3 decoder 194, a speaker 196, and a matching device 199.

Figure 2:
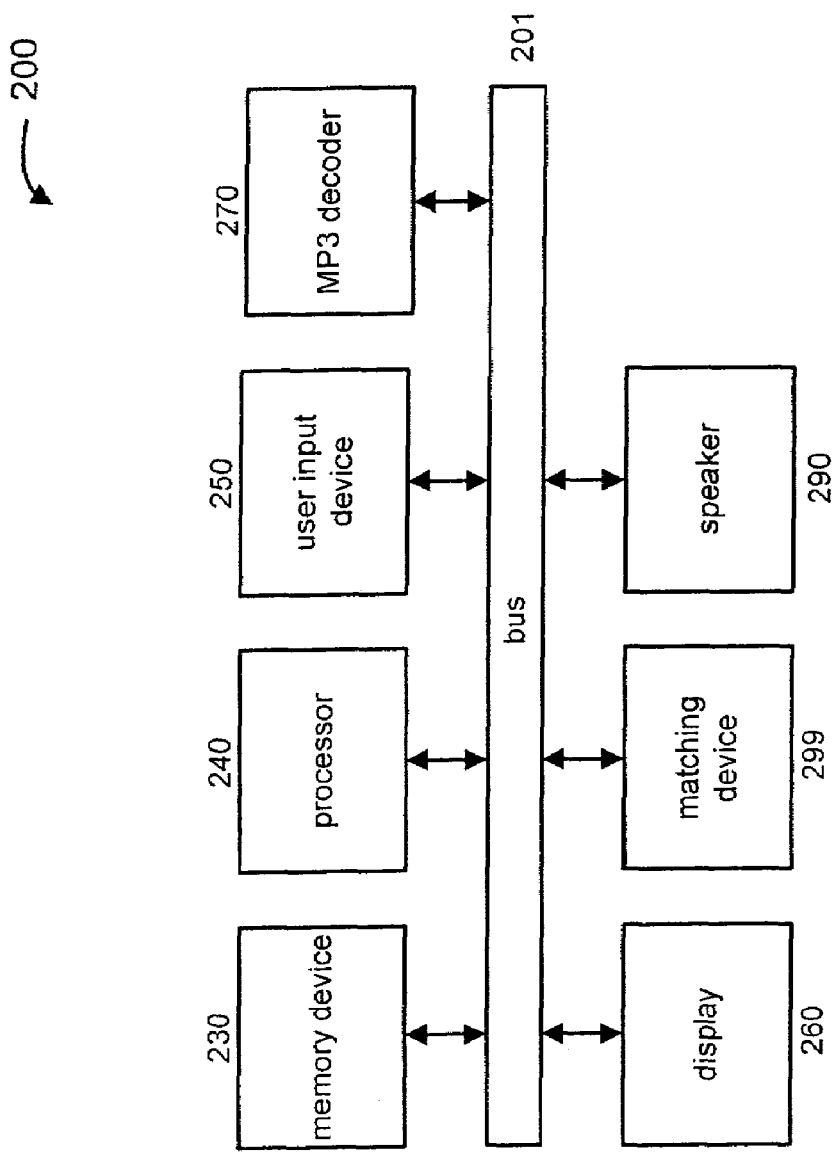
FIG. 2 is a block diagram illustrating an Ebook 200, according to an illustrative embodiment of the present invention.

FIG. 2 is a block diagram illustrating an Ebook 200, according to an illustrative embodiment of the present invention. The Ebook 200 includes the following elements interconnected by bus 201: at least one memory device (hereinafter "memory device" 230); at least one processor (hereinafter "processor" 240); a user input device 250 (e.g., keyboard, keypad, touch sensitive device, and/or remote control); a display 260; an MP3 decoder 270; a speaker 290, and a matching device 299. As is known, the MP3 decoder 270 and the speaker 290 are used to playback MP3 files. The matching device 299 may also be optionally used to playback MP3 files as described below. Given the teachings of the present invention provided herein, one of ordinary skill in the related art will contemplate these and various other configurations of the computer system 100 and Ebook 200 respectively shown in FIGS. 1 and 2, while maintaining the spirit and scope of the present invention. It is to be appreciated that as used herein the term "Ebook" refers to either a standalone Ebook device (e.g., Ebook 200) or an Ebook included in a computer system (e.g., computer system 100).

Figure 3:
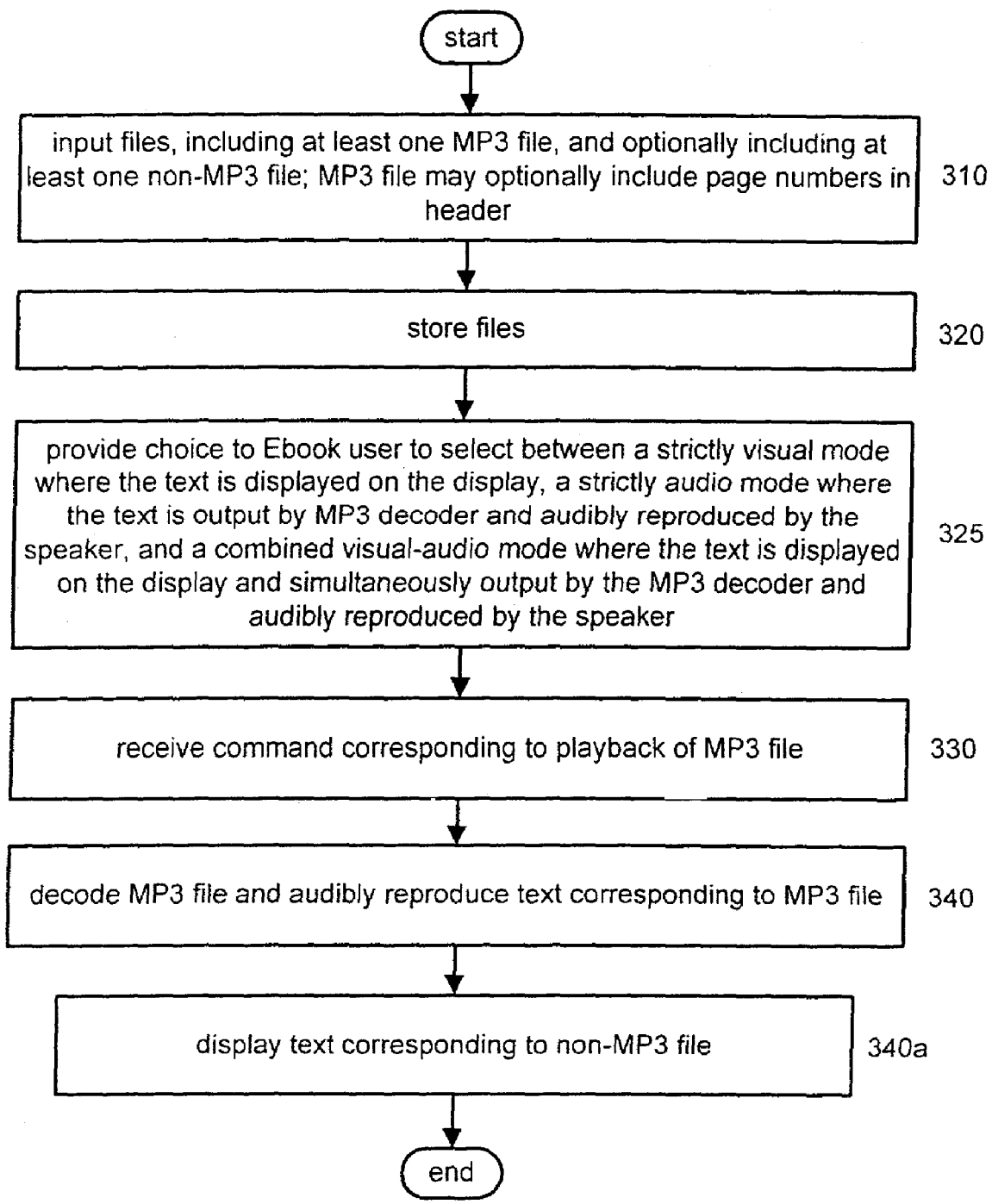
FIG. 3 is a flow diagram illustrating a method for using a talking Ebook, according to an illustrative embodiment of the present invention.

FIG. 3 is a flow diagram illustrating a method for using a talking Ebook, according to an illustrative embodiment of the present invention.

One or more files (hereinafter "files"), including at least one MP3 file (hereinafter "MP3 file"), are input into the Ebook (step 310). The MP3 file includes data corresponding to text that is to be reproduced audibly. Preferably, the one or more files, in addition to including the MP3 file, also include at least one other file (hereinafter "non-MP3 file") having the same text as that to be audibly reproduced from the MP3 file; however, the text of the non-MP3 file is reproduced visually. The files may be provided via a memory device (e.g., floppy disk, compact disk, flash memory, and so forth), downloaded from the Internet, and so forth. The files are then stored in the Ebook (step 320).

Optionally, a choice is provided to a user of the Ebook to select between a strictly visual mode where the text is displayed on the display, a strictly audio mode where the text is output by the MP3 decoder and audibly reproduced by the speaker, and a combined visual-audio mode where the text is displayed on the display and simultaneously output by the MP3 decoder and audibly reproduced by the speaker (step 325). As is evident to one of ordinary skill in the related art, the strictly visual mode corresponds to the non-MP3 file, the strictly audio mode corresponds to the MP3 file, and the combined visual-audio mode corresponds to both the non-MP3 file and the MP3 file.

A command is received by the Ebook (step 330). For the purposes of illustrating the present invention, it is presumed that the command corresponds to at least a playback of the MP3 file. Thus, the command may correspond to, for example, the visual mode or the visual-audio mode optionally provided at step 325, or to a playback of the MP3 file that is independent of the modes provided at step 325.

The MP3 file is decoded and the text corresponding thereto is audibly reproduced in response to the command (step 340). Accordingly, the Ebook user may assimilate content from the Ebook without having to look at a display. It is to be appreciated that step 340 may also include the step of displaying the text included in the non-MP3 file concurrently with the audible reproduction of the text from the MP3 file (step 340a). For example, the text would be both audibly and visually reproduced if the command received at step 335 corresponded to the combined visual-audio mode.

Figure 4:
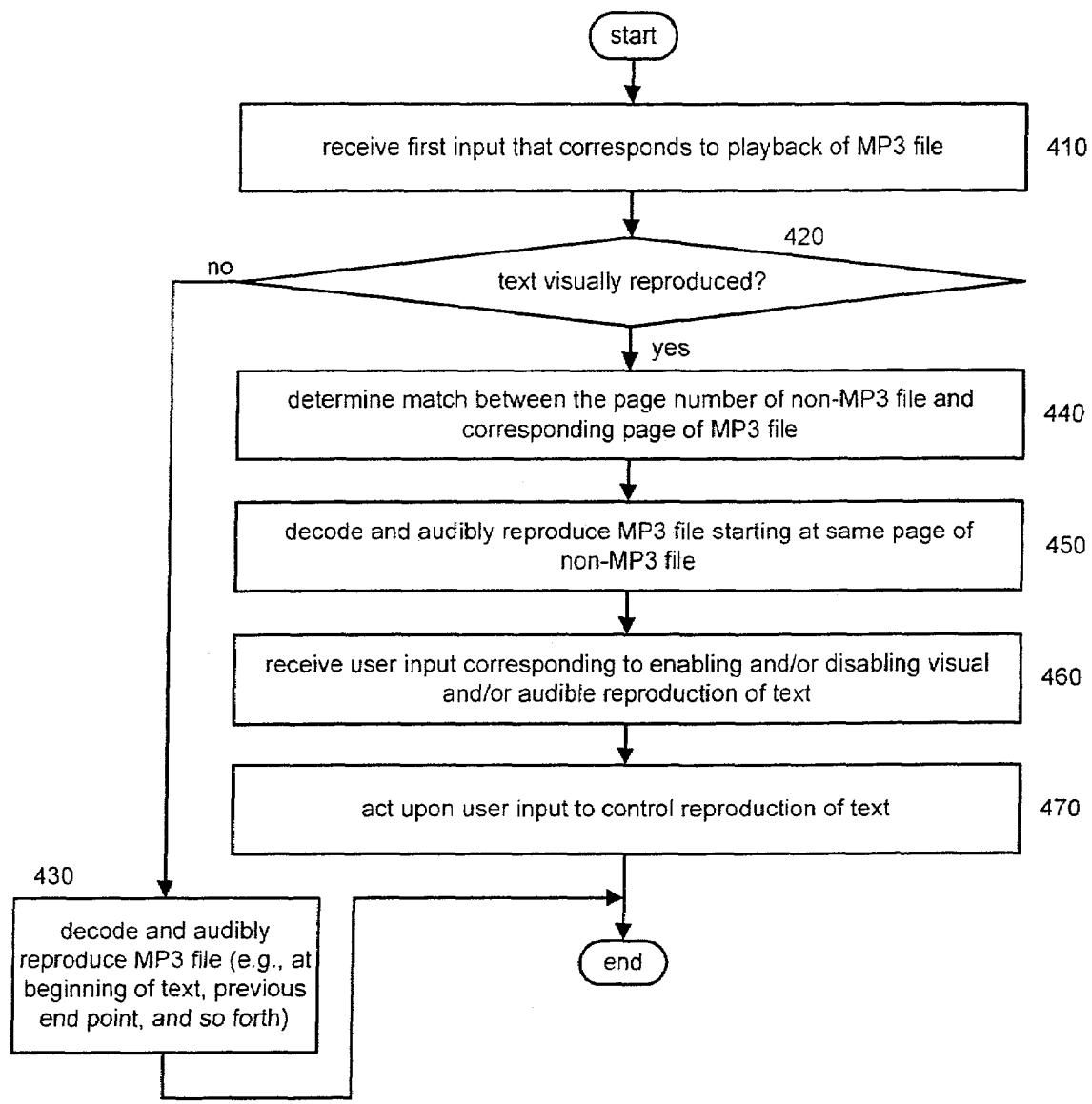
FIG. 4 is a flow diagram further illustrating steps 330 and 340 of the method of FIG. 3, according to an illustrative embodiment of the present invention.

FIG. 4 is a flow diagram further illustrating steps 330 and 340 of the method of FIG. 3, according to an illustrative embodiment of the present invention. According to the illustrative embodiment of FIG. 4, the MP3 file includes a header portion that, in turn, includes page numbers. The page numbers included in the header of the MP3 file are matched to corresponding page numbers in the non-MP3 file as described immediately hereinafter.

A command is received from a user of the Ebook that corresponds to a playback of the MP3 file (step 410). It is then determined whether the text corresponding to the MP3 file is already being reproduced visually from the non-MP3 file (step 420). If not, then the MP3 file is decoded and audibly reproduced (step 430). Otherwise, a match is determined between the page number of the non-MP3 file that is currently being visually reproduced and a corresponding page number of the MP-3 file (step 440). The MP3 file is then decoded and audibly reproduced starting at the same page as the non-MP3 file (step 450). This allows a user to seamlessly continue assimilating content from the Ebook first visually and then audibly. It is to be appreciated that step 430 may be performed to decode and audibly reproduce the text at the beginning of the text, at a point in the text where the audible reproduction was previously ended, or at any other point.

A user input may be received at any time during a visual and/or audible reproduction of the text (step 460). The user input may correspond to disabling and/or enabling any one of the visual and/or audio reproduction. The user input is acted upon to control the reproduction of the text by the Ebook (step 470). While the preceding description has matched an MP3 file to a non-MP3 file based on page numbers, one of ordinary skill in the related art will contemplate this and various other ways in which to correlate an MP3 file and a non-MP3 file, while maintaining the spirit and scope of the present invention.

Although the illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. An Ebook for reproducing printed media, comprising:
a memory device for storing MP3 files and non-MP3 files, the MP3 files and the non-MP3 files both corresponding to the printed media;
an MP3 decoder for decoding the MP3 file to output text corresponding to the printed media;
at least one speaker for audibly reproducing the text corresponding to the printed media from the MP3 files;
a display for visually reproducing the text corresponding to the printed media from the non-MP3 files, and
a matching module capable of synchronizing an audible reproduction of the text from the MP3 files with a visual reproduction of the text from the non-MP3 files, and
wherein the MP3 files and the non-MP3 files are separately encoded, and
wherein a user is capable of selectively enabling and disabling any one of the audible reproduction and the visual reproduction.

2. The Ebook of claim 1, wherein a choice is provided to a user of the Ebook to select between a strictly visual mode where the text is displayed on the display, a strictly audio mode where the text is output by said MP3 decoder and audibly reproduced by said speaker, and a combined visual-audio mode where the text is displayed on the display and simultaneously output by said MP3 decoder and audibly reproduced by said speaker.

3. The Ebook of claim 1, wherein said matching device matches a current page of the non-MP3 file with a corresponding page of the MP3 file so that a current visual reproduction of the text from the non-MP3 file can be continued by an audible reproduction of the text from the MP3 file.

4. The Ebook of claim 1, wherein said matching device matches a current page of a non-MP3 file with a corresponding page of the MP3 file when the text is being currently visually reproduced from the non-MP3 file, and wherein said MP3 decoder begins decoding the text at the corresponding page of the MP3 file.

5. The method of claim 1, wherein the printed media is without musical data.

6. The method of claim 1, wherein the text is capable of being audibly reproduced and visually reproduced both without any combinational encoding of the MP3 files together with the non-MP3 files.

7. The method of claim 1, wherein said display displays non-text images corresponding to the printed media as part of visually reproducing the printed media.

8. The method of claim 1, wherein the printed media comprises at least one of a magazine, a newspaper, and a book.

9. The method of claim 1, wherein said display visually reproduces the text corresponding to the printed media from the non-MP3 files without any content in the non-MP3 files ever being converted to MP3 format for such visual reproduction.

10. A method for using an Ebook to reproduce printed media, comprising the steps of:
    storing at least one MP3 file and at least one non-MP3 file in the Ebook, the at least one MP3 file and the at least one non-MP3 file both corresponding to the printed media;
    decoding the MP3 file to output text corresponding to the printed media;
    audibly reproducing the text corresponding to the printed media from the at least one MP3 file;
    visually reproducing the text corresponding to the printed media from the at least one non-MP3 and
    synchronizing an audible reproduction of the text from the at least one MP3 file with a visual reproduction of the text from the at least one non-MP3 file, and
    wherein the MP3 files and the non-MP3 files are separately encoded, and
    wherein a user is capable of selectively enabling and disabling any one of the audible reproduction and the visual reproduction.

11. The method of claim 10, wherein said method further comprises the steps of:
    providing to a user of the Ebook a choice between a strictly visual mode where the text is visually reproduced, a strictly audio mode where the text is audibly reproduced, and a combined visual-audio mode where the text is both visually reproduced and audibly reproduced; and
    operating the Ebook in accordance with the choice of the user.

12. The method of claim 10, wherein said synchronizing step comprises the step of matching a current page of the non-MP3 file with a corresponding page of the MP3 file so that a current visual reproduction of the text from the non-MP3 file can be continued by an audible reproduction of the text from the MP3 file.

13. The method of claim 12, wherein said synchronizing step further comprises the step of inserting page numbers in a header of the MP3 file so as to correlate the page numbers with corresponding page numbers in the non-MP3 file.

14. The method of claim 10, wherein said synchronizing step comprises the steps of:
    determining whether the text is being currently visually reproduced from a non-MP3 file; and
    matching a current page of the non-MP3 file with a corresponding page of the MP3 file when the text is being currently displayed from the non-MP3 file;
    wherein said decoding step is controlled to begin decoding the text at the corresponding page of the MP3 file.

15. The method of claim 14, wherein said synchronizing step further comprises the step of inserting page numbers in a header of the MP3 file, the page numbers being associated with corresponding pages in a non-MP3 file.

16. The method of claim 10, wherein the printed media is without musical data.

17. The method of claim 10, wherein the text is capable of being audibly reproduced and visually reproduced both without any combinational encoding of the MP3 files together with the non-MP3 files.

18. The method of claim 10, wherein said display displays non-text images corresponding to the printed media as part of visually reproducing the printed media.

19. The method of claim 10, wherein the printed media comprises at least one of a magazine, a newspaper, and a book.

20. The method of claim 10, wherein the text corresponding to the printed media is visually reproduced from the non-MP3 files without any content in the non-MP3 files ever being converted to MP3 format for such visual reproduction.

* * * * *